United States Patent [19]
Hosoya et al.

[11] Patent Number: 5,289,230
[45] Date of Patent: Feb. 22, 1994

[54] PRICE PRINTER AND PHOTOGRAPHIC-FILM CARRIER FOR PHOTOGRAPHIC PROCESSING SYSTEM

[75] Inventors: Mitsukazu Hosoya; Yoshikazu Majima; Toshihiko Narita, all of Kanagawa, Japan

[73] Assignee: Fuji Photo Film Co., Ltd., Kanagawa, Japan

[21] Appl. No.: 899,290

[22] Filed: Jun. 16, 1992

[30] Foreign Application Priority Data

Jun. 17, 1991 [JP] Japan .................. 3-144957
Jun. 17, 1991 [JP] Japan .................. 3-144958

[51] Int. Cl.$^5$ ............... G03B 27/48; G03B 27/58
[52] U.S. Cl. .......................... 355/50; 355/40
[58] Field of Search ............. 355/32, 35, 38, 40, 355/50, 51, 27, 29; 235/58 R

[56] References Cited

U.S. PATENT DOCUMENTS 4,115,981  9/1978  Hell et al. .................. 53/55
4,293,215  10/1981  Rosborough, Jr. et al. ........ 355/40

*Primary Examiner*—Richard A. Wintercorn
*Attorney, Agent, or Firm*—Sughrue, Mion, Zinn, Macpeak & Seas

[57] ABSTRACT

A price printer for printing prices relative to photographic processing, which is suitable for a printer-processor for printing image recorded on photographic films onto photographic papers. The price printer is disposed in a position where each image printed on the photographic paper is detected. The number of defective prints selected by detection is input by an operator. The number of the defective prints is subtracted from the total number of prints which is automatically input from the printer-processor to calculate the number of prints to be delivered to a customer and compute a print price to be printed. Therefore, a proper statement of delivery can be made at a time and the efficiency of work can be improved. A photographic-film carrier capable of automatically detecting information about the length of a processed photographic film can be provided. The price printer can read the length information so as to determine the kind of the photographic film and automatically set and print a development price. A process for determining the development price by the operator can be eliminated and a further improvement in the work efficiency can be made.

16 Claims, 10 Drawing Sheets

FIG. 7

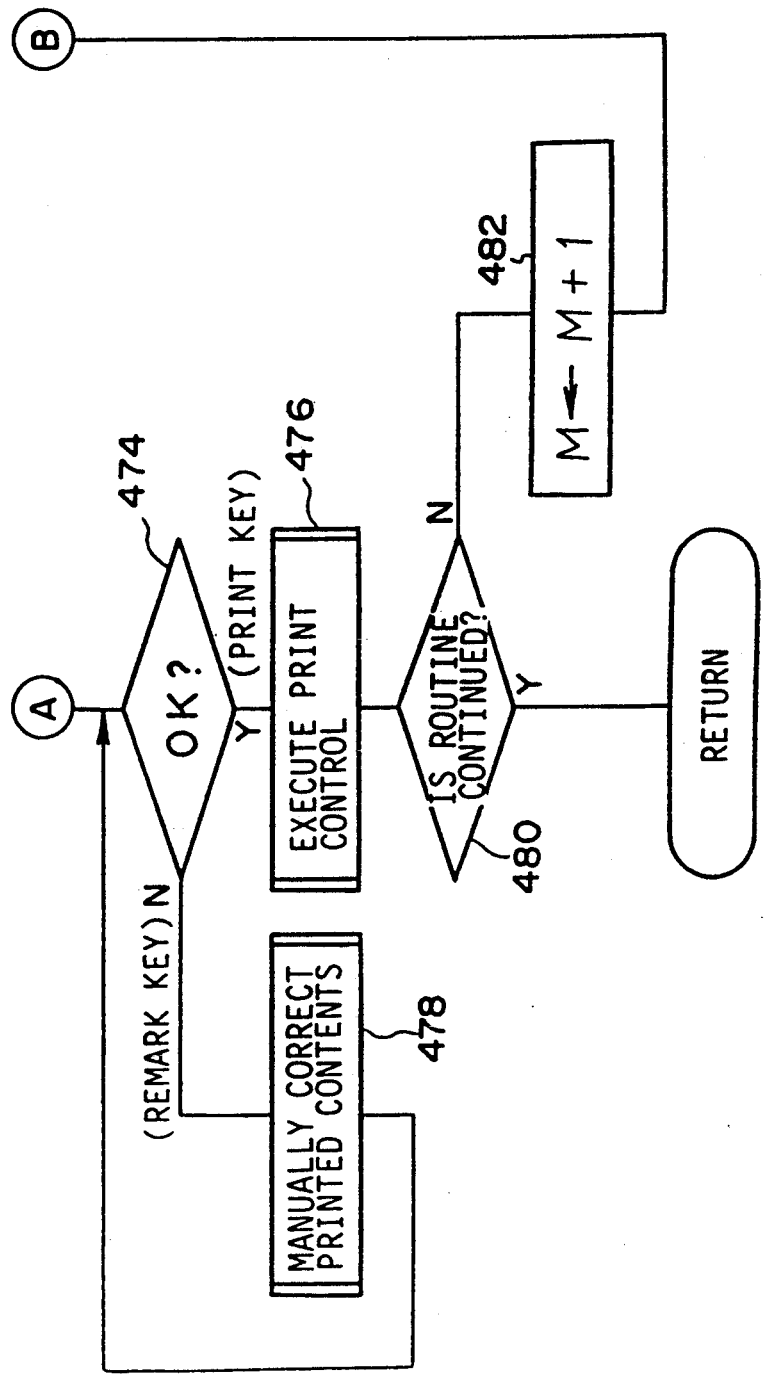

PRICE PRINTER AND PHOTOGRAPHIC-FILM CARRIER FOR PHOTOGRAPHIC PROCESSING SYSTEM

BACKGROUND OF THE INVENTION

1. Field of the Invention:

The present invention relates to a price printer and a photographic-film carrier suitable for use in a photographic processing system for printing images recorded on photographic films on photographic papers.

2. Description of the Related Art:

A printer-processor is referred to as a so-called mini laboratory and placed in a DPE shop. In the printer-processor, an exposure unit for subjecting images recorded on a negative film to exposure and a processor unit for subjecting an exposed photographic paper to development are combined into a single unit. By simply setting an elongated photographic paper in place, the elongated photographic paper can automatically be conveyed to the exposure unit and the processor unit and processed thereat.

A price printer can be connected to the printer-processor. The price printer is used to print a development price, a print price and the total of these prices on a statement of delivery on which predetermined items have been printed in advance.

The price printer can be operated in cooperation with a sort key attached to the printer-processor. That is, the sort key is operated when a single negative film has been processed. The number of prints processed with respect to the single negative film is automatically input to the price printer.

A plurality of unit prices of printing and a plurality of development prices are stored in the price printer in each channel. The unit prices differ depending on the DPE shop for accepting negative films or whether there is a sales campaign, for example. The development prices vary depending on the length (e.g., 12 exposures, 24 exposures and 36 exposures) of the negative film. Combinations of these unit and development prices are set in the respective channels in advance. By selecting a desired channel, a development price, a print price and the total of these prices are calculated at the time that the number of the prints is input, so that they can be printed in given positions on the statement of delivery.

When a so-called blur or the like is detected on a print after the printing process has been done, the print is taken out so that it is not delivered to a customer. In the conventional price printer, however, the print price is calculated depending on the number of the prints at the time that the sort key has been operated and the printing process of the print price is made. Therefore, the statement of delivery should be remade when the blurred shots are taken out, thereby causing a cumbersome process.

In the conventional method, it is necessary for the operator to measure the length of each negative film and determine the development price relative to its length. Therefore, the process for determining the development price is cumbersome.

SUMMARY OF THE INVENTION

With the foregoing in view, it is an object of the present invention to provide a price printer suitable for use in a photographic processing system, which is capable of eliminating a rewriting process and improving the efficiency of work by computing a print price according to the number of prints to be delivered to a customer and printing it in place.

It is a further object of the present invention to provide a price printer suitable for use in a photographic processing system, which is capable of improving the efficiency of a printing process by automatically determining the kind of photographic film and deciding a development price based on the result of the determination.

It is a still further object of the present invention to provide a photographic-film carrier suitable for use in a photographic processing system, which is capable of reading information about the length of each photographic film in order to determine the kind of each photographic film.

According to a first aspect of the present invention, there is provided a price printer suitable for use with a photographic processing system for printing images which have been recorded on photographic films onto photographic papers, the price printer being used to print prices relative to photographic processing, the price printer comprising storing means for storing therein both a unit price of development of the photographic film and the number of developed photographic films and both a unit price of printing of the photographic paper and the number of prints, inputting means for changing at least one of the unit price of development, the number of developed photographic films, the unit price of printing and the number of the prints, computing means for computing a development price, a print price and the total of these prices based on the unit price of development, the number of developed photographic films, the unit price of printing and the number of the prints, and printing means for printing the development price, the print price and the total of these prices all of which have been computed by the computing means. Further, the price printer includes reading means for reading the number of the prints from the photographic processing system.

According to the above-described construction of the present invention, the unit price of development, the number of the developed photographic films, the unit price of printing and the number of the prints are changed as needed by the inputting means. Thereafter, the development price, the print price and the total of these prices are calculated by the computing means and printed by the printing means. Since an operator can change the number of the prints before the printing process is carried out, the print price can be calculated and printed depending on the number of the prints to be actually delivered to a customer even if the difference between the number of the prints, which has been stored in the storing means and the number of prints to be actually delivered to the customer is produced, for example. Thus, a re-printing process or the like is unnecessary and the efficiency of work is improved. The unit price of printing can also be easily changed to another during a campaign, for example.

In addition, the number of the processed photographic papers can be read from the photographic processing system. However, images on the photographic paper subjected to a printing process are detected, so that defective prints with blurs or the like produced thereon are removed. Therefore, there is often a situation in which the number of the prints read from the photographic processing system is different from the number of prints to be actually delivered to the customer. In this case, the number of the defective prints selected upon detection can be input by the inputting means and a print price can be calculated by the computing means based on the number of the prints obtained by subtracting the number of the defective prints from the number of the read prints. As a result, the number of the prints to be actually delivered to the customer after the detection can be accurately determined. Thus, since the print price can be accurately determined, a re-printing process or the like is unnecessary even if the defective prints are produced upon detection, and the efficiency of work is improved.

In the price printer as well, information about the length of the photographic film which has been processed in the photographic processing system can also be read from the photographic processing system so as to set a development price based on the read information. Thus, the development price can be printed even if the length of the photographic film is not actually measured by the operator. It is therefore possible to improve the efficiency of a process for drawing up a statement of delivery which is notified to the customer.

According to a second aspect of the present invention, there is provided a price printer suitable for use with a photographic processing system for printing images which have been recorded on photographic films onto photographic papers, the price printer being used to print prices relative to photographic processing, the price printer comprising reading means for reading information about the photographic film which has been processed in the photographic processing system, and the number of prints from the photographic processing system, storing means for storing therein the information about the photographic film, and the number of the prints both of which have been read by the reading means, and preset unit price of printing, inputting means for changing the unit price of the printing and for inputting the number of defective prints which have been detected at the time of detection of the images printed on the photographic papers, setting means for setting a development price based on the information about the photographic film, computing means for computing a print price based on the value obtained by subtracting the number of the defective prints input by the inputting means from the number of the prints, which has been stored in the storing means, and the unit price of printing and for calculating the total of the print price and the development price, and printing means for printing the development price set by the setting means, the print price computed by the computing means and the total of the development price and the print price.

According to the above-described construction of the present invention, the information about the photographic film, and the number of the photographic papers subjected to the printing process are read from the photographic processing system. The information and the number of the prints are stored in the storing means together with the preset unit price of printing. The setting means sets the development price based on the above information. The number of the printed defective prints detected upon detection of the images is input by the inputting means. The print price is calculated by the computing means based on the value obtained by subtracting the number of the defective prints from the number of the prints stored in the storing means and the preset unit prices. In addition, the total price is also calculated by the computing means. The development price, the print price and the total of these prices or the like are printed by the printing means.

Thus, the development price is automatically set and printed based on the above information even if the length of the photographic film is not actually measured by an operator. Therefore, the efficiency of a process for drawing up a statement of delivery notified to a customer is improved. In addition, the print price is calculated based on the number of the prints, which is obtained by subtracting the number of the defective prints from the stored number of the prints, and printed in place. Therefore, a re-printing process or the like is unnecessary and the efficiency of work is improved.

According to a third aspect of the present invention, there is provided a photographic-film carrier suitable for a photographic processing system for printing images recorded on photographic films onto photographic papers, the photographic-film carrier being used to convey the photographic film in a desired direction so as to position each image frame of the photographic film in a printing position, the photographic-film carrier comprising conveying means for conveying a lengthy film comprising a plurality of photographic films connected to one another, detecting means for detecting whether or not the photographic film has been placed in the printing position, specifying means for detecting and specifying the rear end of a single photographic film, and computing means for determining the length of the photographic film which passes through the printing position during a period from the detection of the printing position of the photographic film by the detecting means to the specifying of the rear end of the single photographic film by the specifying means.

According to the above-described construction of the present invention, a plurality of photographic films subjected to a printing process are normally connected to one another and processed in an elongated manner. When the lengthy film comprising the plurality of photographic films connected to each other passes through the printing position, it is detected whether or not the photographic film is in the printing position. The ends of the photographic films can be recognized for each photographic film by detecting joining materials (such as a splice tape, etc.) for connecting the photographic films to one another, for example. Now, the length of the photographic film which passes through the printing position, is determined during a period from the beginning of the detection of the photographic film to the detection of the rear end of a single photographic film. The length of the photographic film can be computed based on the number of pulses generated by a pulse motor used as the conveying means for conveying the photographic film, which is driven during a period in which the single photographic film is being detected. Since a conveying distance, which is set by one pulse generated by the pulse motor, has been determined in advance, the length of the photographic film can easily be determined. Thus, the length of the photographic film can automatically be recognized, thereby making it possible to improve the efficiency of a process such as setting of the development price or the like in a post-step, for example.

Incidentally, the photographic-film carrier can be employed in the photographic processing system together with the price printer of the present invention.

According to the price printer of the present invention for the photographic processing system, as described above, a rewriting process can be eliminated and the efficiency of work can be improved by computing a print price according to the number of prints to be delivered to a customer and printing it. Further, an excellent advantageous effect can be brought about in that a development price can automatically be determined based on information about the photographic film and the efficiency of a printing process can be improved.

The photographic-film carrier of the present invention for the photographic processing system can bring about an excellent advantageous effect in that the length of the photographic film can be read for each photographic film.

The above and other objects, features and advantages of the present invention will become apparent from the following description and the appended claims, taken in conjunction with the accompanying drawings in which a preferred embodiment of the present invention is shown by way of illustrative example.

BRIEF DESCRIPTION OF THE DRAWINGS

FIG. 7 is a plan view illustrating an original paper (a statement of delivery);

FIGS. 9A and 9B are flowcharts for describing a print control routine according to the present invention.

DETAILED DESCRIPTION OF THE PREFERRED EMBODIMENTS

Figure 1:
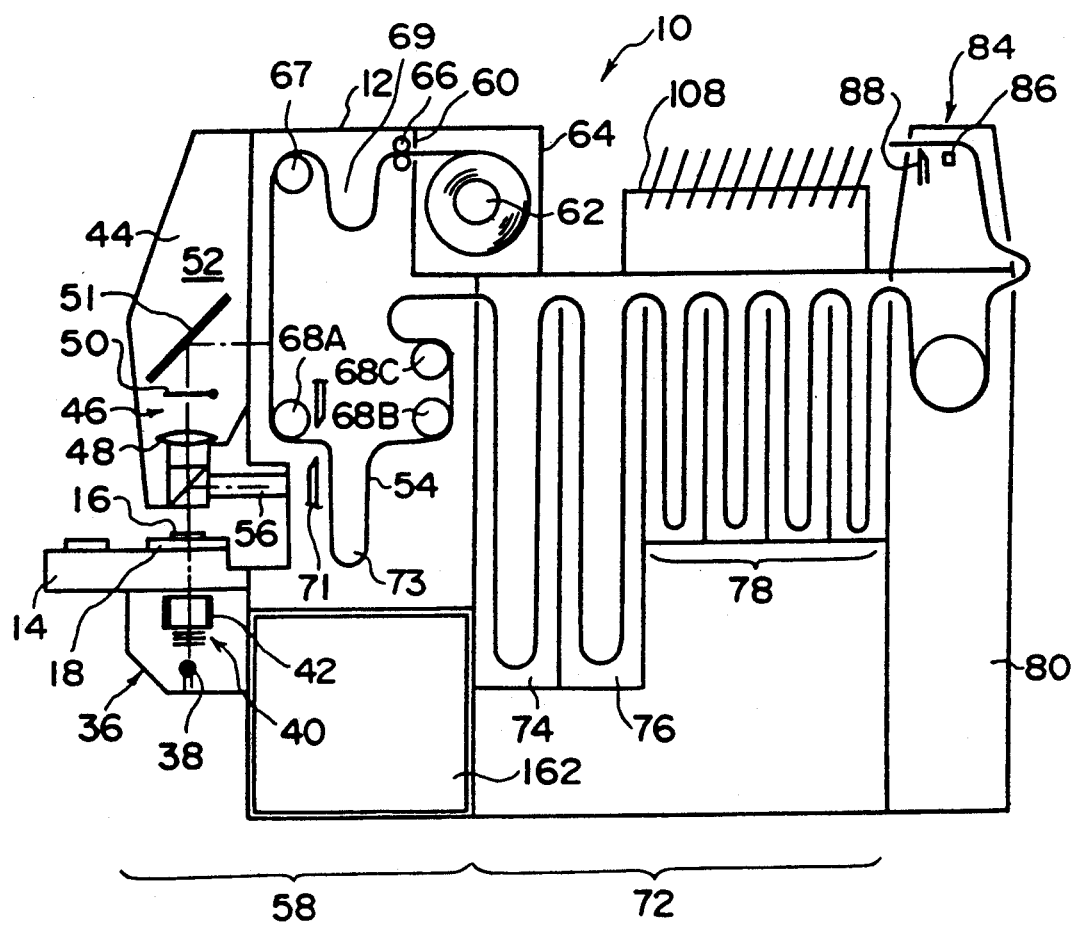
FIG. 1 is a schematic view showing the internal structure of a printer-processor according to one embodiment of the present invention.

FIG. 1 shows a printer-processor 10 according to one embodiment of the present invention, which serves as a part of a photographic processing system. The overall structure of the printer-processor 10 will first be described.

The printer-processor 10 is externally covered by a casing 12.

The printer-processor 10 is provided with a working table 14 on the left side as seen in FIG. 1, which projects from the casing 12. A negative carrier 18 loaded with a negative film 16 is placed on the upper surface of the working table 14. The detailed structure of the negative carrier 18 will be described later.

A light source unit 36 is disposed below the working table 14. The light source unit 36 is provided with a light source 38. Light emitted from the light source 38 is transmitted through a filter unit 40 and a diffusion barrel 42 to the negative film 16 loaded in the negative carrier 18. The filter unit 40 comprises three filters of cyan (C), magenta (M) and yellow (Y), each of which can be arranged on the optical axis of the light.

An optical system 46 is mounted to an arm 44 disposed above the working table 14. The optical system 46 has a lens 48, a shutter 50 and a reflecting mirror 51. The lens 48 and the shutter 50 are disposed in the optical axis of the light. The light, which has passed through the negative film 16, passes through the lens 48 and the shutter 50. The optical path of the light is switched by the reflecting mirror 51 (i.e., the optical axis of the light is switched to about 90 degrees). Thereafter, an image of the negative film 16 is focused on photographic paper 54 set in an exposure chamber 52.

The optical system 46 has a density measuring unit 56 such as a CCD, for measuring the density of the negative film 16. The density measuring unit 56 is connected to a controller 162 (see FIG. 3), which sets an exposure correction value at the time of exposure on the basis of data measured by the density measuring unit 56 and data input via keys operated by an operator.

An exposure unit 58, comprising the light source unit 36, the optical system 46 and the exposure chamber 52, performs a printing process.

An attachment or mounting portion 60 is disposed at the corner where the side face of the arm 44 as seen on the right-hand side thereabove meets the upper surface of the casing 12. A paper magazine 64 for winding (unwinding) the photographic paper 54 onto a reel 62 in layer form and accommodating it therein is mounted on the mounting portion 60.

A pair of rollers 66 is disposed in the vicinity of the mounting portion 60, and horizontally conveys the photographic paper 54 to the exposure chamber 52 while the photographic paper 54 is interposed therebetween. The photographic paper 54 is wound round the roller 67 on this side of the arm 44 and turned 90 degrees so as to extend in a vertical direction. Incidentally, a first stock unit 69 for guiding the photographic paper 54 substantially in the form of a U-shape and stocking it therein is disposed between the rollers 66 and the roller 67.

Rollers 68A, 68B and 68C are disposed below an exposure portion of the exposure chamber 52. The photographic paper 54 on which the image of the negative film 16 is printed within the exposure chamber 52, is turned by each of these rollers 68A, 68B and 68C about 90 degrees and conveyed to a color development unit 74 of a processor unit 72 adjacent to the exposure chamber 52.

A cutter 71 is disposed on the downstream side of the roller 68A. The cutter 71 serves to cut the rear end of the photographic paper 54 which has already been subjected to an exposure process. Therefore, the photographic paper 54 which remains in the exposure unit 58, can be rewound onto the reel 62 of the paper magazine 64.

A second stock unit 73 for guiding the photographic paper 54 subjected to the printing process substantially in the form of the U-shape and stocking it therein, is disposed between the roller 68A and the roller 68B. The second stock unit 73 stocks the photographic paper 54 therein and offsets the difference between a time interval required for the exposure unit 58 to apply printing processing to the photographic paper 54 and a time interval required for the processor unit 72 to apply development, fixing and water cleaning to the photographic paper 54.

The color development unit 74 wets the photographic paper 54 with a developer so as to subject it to development. Afterwards, the developed photographic paper 54 is conveyed to a bleaching fixing unit 76 provided adjacent the color development unit 74. The bleaching fixing unit 76 wets the photographic paper 54 with a liquid fixer so as to subject it to fixing. The photographic paper 54, which has been subjected to the fixing process, is conveyed to a washing unit 78 disposed adjacent to the bleaching fixing unit 76. The washing unit 78 wets the photographic paper 54 with washing water so as to subject it to a washing process.

The photographic paper 54, which has been subjected to the washing process, is conveyed to a drying unit 80 disposed adjacent to the washing unit 78. In the drying unit 80, the photographic paper 54 is wound round a roller and dried with hot air.

The photographic paper 54, which has been subjected to a drying process, is sandwiched between a pair of rollers which is unillustrated, and discharged from the drying unit 80 at a given speed. A cutter unit 84 is disposed on the downstream side of the drying unit 80. The cutter unit 84 comprises a cut mark sensor 86 for detecting a cut mark applied to the photographic paper 54 and a cutter 88 for cutting the photographic paper 54. The photographic paper 54 is cut for each image frame and discharged to the outside from the casing 12 of the printer-processor 10.

The cut photographic papers 54 are sorted by a sorter 108. After the photographic papers 54, which are prints having defects such as a so-called blur, etc., have been sorted out from the cut photographic papers 54 by performing a detecting process, the prints without defects are returned to a customer together with the statement of delivery and the negative film.

Development and print fees or prices of the negative film 16 and the total of these prices are printed on the statement of delivery by a price printer 300 connected online to the printer-processor 10. The construction of the price printer 300 will be described later.

Figure 3:
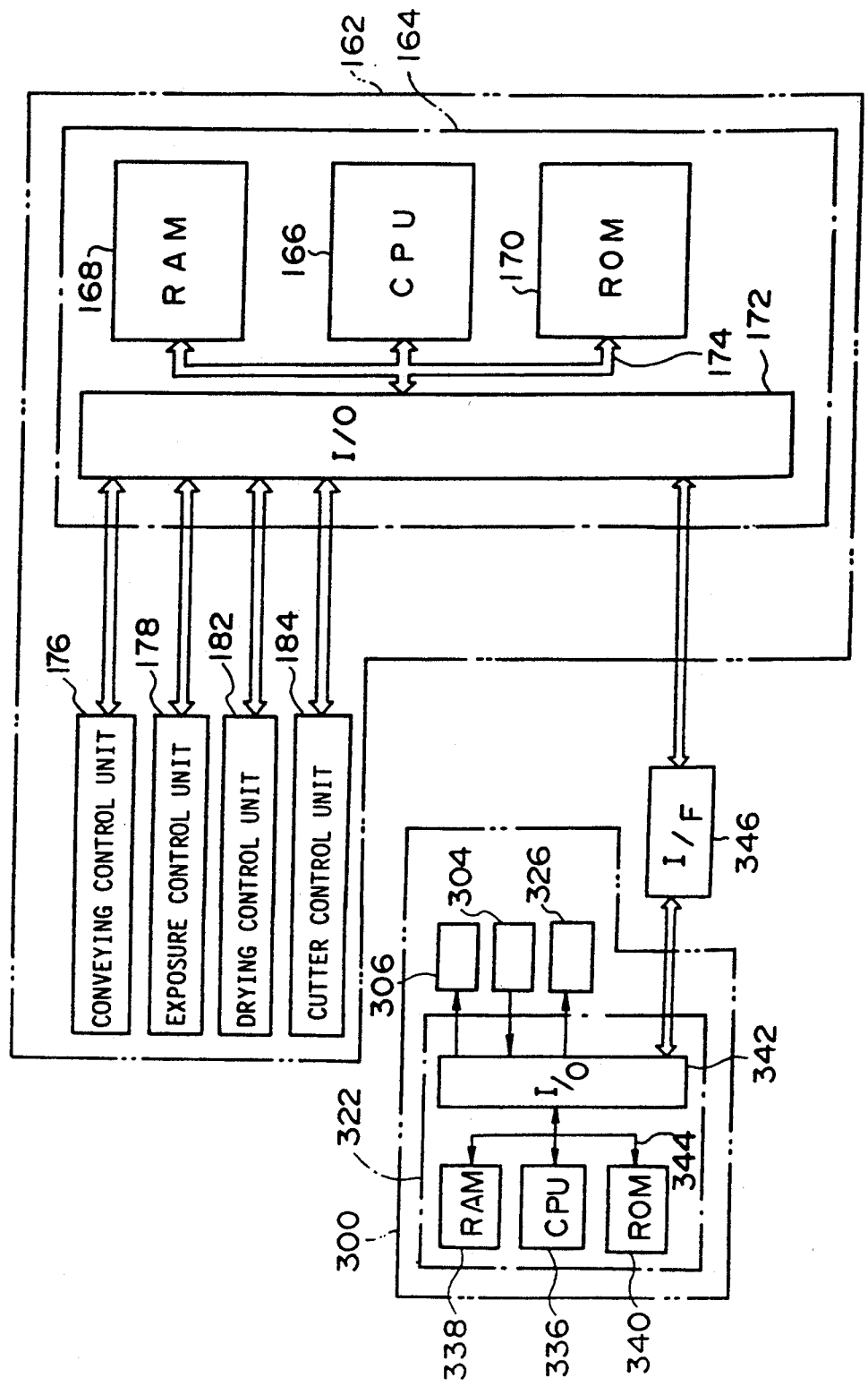
FIG. 3 is a block diagram illustrating control units of both a printer-processor and a price printer.

As illustrated in FIG. 3, each control unit is controlled by the controller 162. The controller 162 includes a microcomputer 164. The microcomputer 164 comprises a CPU 166, a RAM 168, a ROM 170, an input/output port 172 and buses 174 such as a data bus, a control bus, etc., which connect these components to one another.

Connected to the controller 162 are a conveying control unit 176 for controlling a conveying system in the printer-processor 10, which is used to convey the negative film 16 and the photographic paper 54, and an exposure control unit 178 for controlling an exposure system in the exposure unit 58, which energizes a light source 38, makes frequent appearances of each filter on the optical path, feeds frames in a desired direction in the negative carrier 18 and opens and closes the shutter 50 and the like. Also connected to the controller 162 are a dry control unit 182 for controlling the driving of a fan and a heater employed in the drying unit 80 and a cutter control unit 184 for controlling the detection of a cut mark by the cut mark sensor 86 of the cutter unit 84 disposed on the downstream side of the drying unit 80 and the cutting of the photographic paper 54 by the cutter 88.

Figure 2:
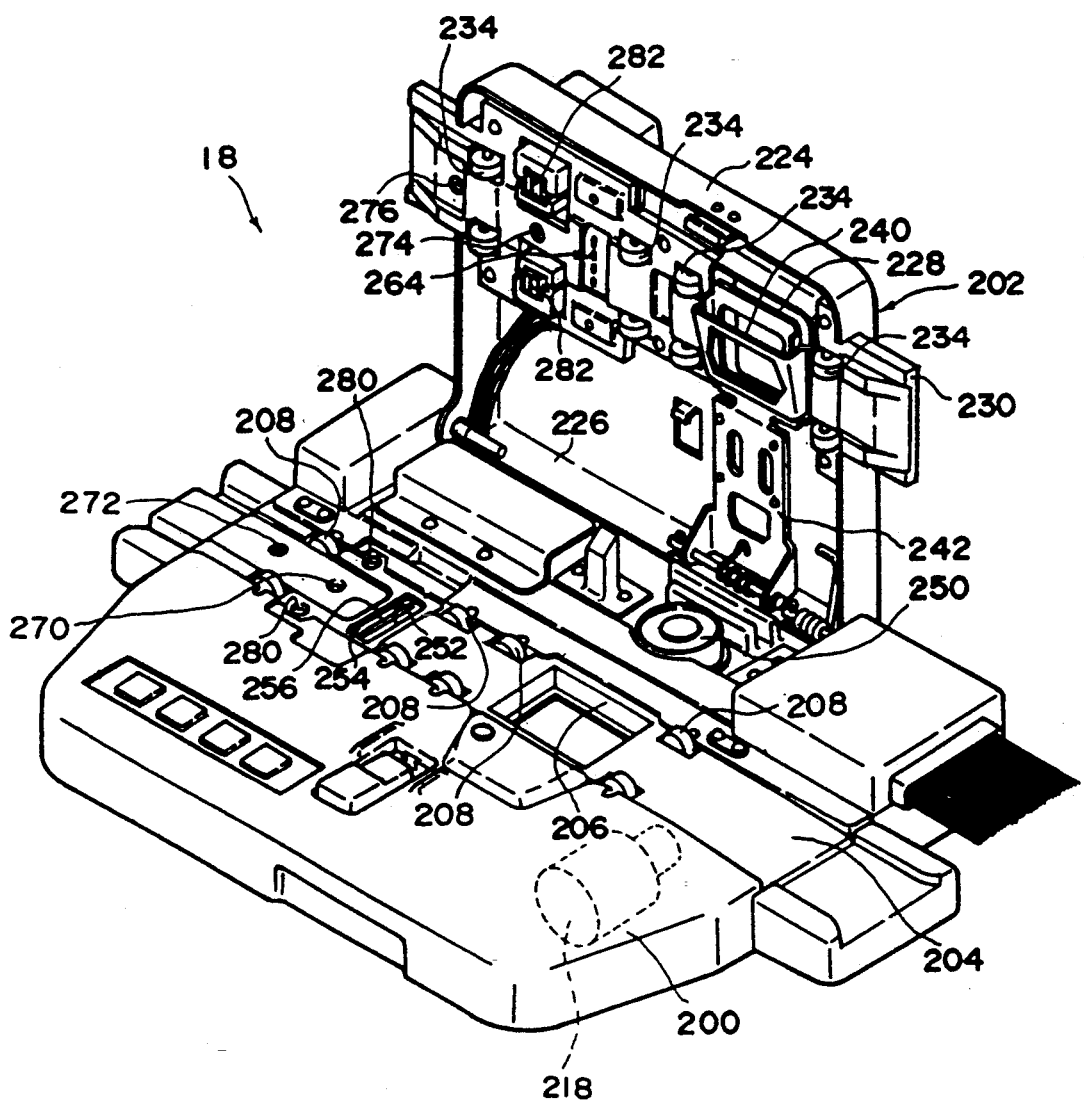
FIG. 2 is a perspective view showing a negative carrier.

FIG. 2 shows the negative carrier 18 employed in the present embodiment. The negative carrier 18 is mainly comprised of a base 200 and an opening and closing cover 202.

The base 200 is formed with a negative-film conveying path 204 which has a printing aperture 206 defined in a longitudinally-extending intermediate portion thereof. The printing aperture 206 is used as an irradiation hole for the light emitted from the light source 38 disposed in the printer-processor 10.

Respective pairs of conveying rollers 208 are disposed in the negative-film conveying path 204 over the range from the upstream side (i.e., the left-hand direction in FIG. 2) to the downstream side (i.e., the right-hand direction in FIG. 2) in confronting relationship with the reverse side (lower surface) of the negative film 16 with the printing aperture 206 interposed therebetween. The respective pairs of conveying rollers 208 are subjected to driving forces produced by a pulse motor 218 via endless timing belts (not shown). When the pulse motor 218 is rotated, the respective pairs of conveying rollers 208 are driven in the same rotational direction and at the same rotational speed.

The opening and closing cover 202 has a main body 224 shaped in the form of a casing, whose lower end is supported by a bar 226 fixed to the base 200. The opening and closing cover 202 can be swung about the bar 226 and opened and closed in an opposing relationship to the base 200.

A through hole 228 is formed in the bottom of the main body 224 of the cover 202 in facing relationship to the printing aperture 206. An upper guide base 230 is disposed in a position corresponding to the negative-film conveying path 204 in a closed state of the main body 224.

Respective pairs of idle rollers 234 are mounted to the upper guide base 230 in confronting relationship with the conveying rollers 208. In addition, the idle rollers 234 are rotated together with the corresponding conveying rollers 208 so as to sandwich the negative film 16 therebetween.

An upper mask 240 movable relative to the upper guide base 230 and having an opening or aperture formed in a position corresponding to the through hole 228, is disposed in an intermediate portion of the upper guide base 230 as seen from the negative-film conveying direction. The upper mask 240 is supported by a mask base 242.

The mask base 242 is supported by a shaft at a position adjacent to the center at which the main body 224 is turned. When a main body 250 of a solenoid mounted in the base 200 is energized in the state in which the main body 224 is closed, the mask base 242 is attracted by a magnetizing force, thereby making it possible to cause the upper mask 240 to be closely fitted in the printing aperture 206 of the negative-film conveying path 204. As a result, the negative film 16 positioned in the optical axis P can be sandwiched between the upper mask 240 and the printing aperture 206.

A light-emitting diode (not shown) is mounted on the reverse side of the negative-film conveying path 204 on the upstream side of the printing aperture 206. The negative film 16 is irradiated with light emitted from the light-emitting diode through a slit 256.

The slit 256 is formed in facing relationship with a picture detector 264 mounted on the upper guide base 230. Thus, the amount of transmitted-light passing through the negative film 16 is detected by the picture detector 264.

Further, LEDs 270, 272 are embedded in a transversely-extending central portion of the negative-film conveying path 204 on the upstream side of the slit 256 along the longitudinal direction of the negative-film conveying path 204.

Figure 4A:
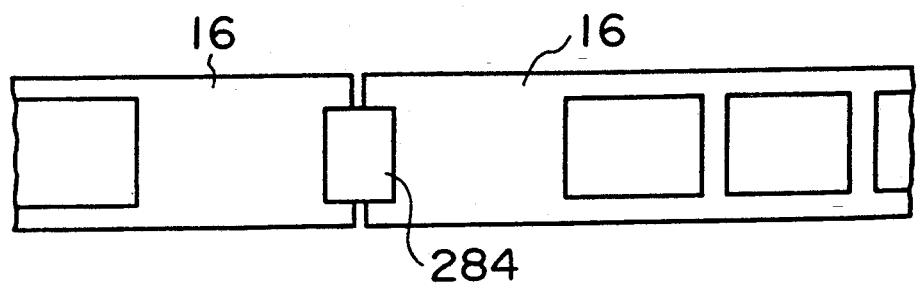
FIG. 4A is a plan view showing the manner in which a plurality of negative films are connected to one another at the time of simultaneous printing.
Figure 4B:
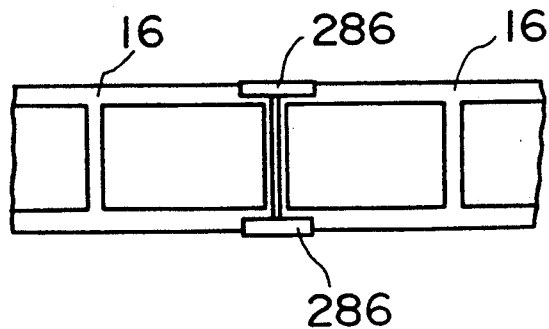
FIG. 4B is a plan view illustrating the manner in which negative films each having six frames are connected to each other at the time of making extra prints.

The LED 270 disposed near the slit 256 is used to detect splice tapes (i.e., tapes applied to transversely-extending central portion of the negative film 16, and hereinafter called "roll splice tapes") 284 employed for joining a plurality of negative films 16 to one another as shown in FIG. 4A and splice tapes (i.e., tapes applied only on transversely-extending both ends of the negative film 16 in order to avoid disappearance of image frames from view, and hereinafter called "piece splice tapes") 286 for connecting the negative films 16 cut every 6 frames to one another again as shown in FIG. 4B and carrying out an extra-printing process.

Further, the LED 272 disposed on the side of a negative-film insertion hole of the negative-film conveying path 204, is used to detect whether or not the negative film 16 has been inserted into the hole.

These LEDs 270, 272 are provided in facing relationship with a tape sensor 274 and a negative-film sensor 276, respectively, disposed on the upper guide base 230 side.

LEDs 280 are embedded in transversely-extending both ends of the negative-film conveying path 204 between the LEDs 270 and 272. The LEDs 280 are respectively provided in confronting relationship with bar code sensor 282 disposed in transversely-extending both ends of the upper guide base 230. In addition, the LEDs 280 can read an ID and a frame number of each negative film 16.

Figure 5:
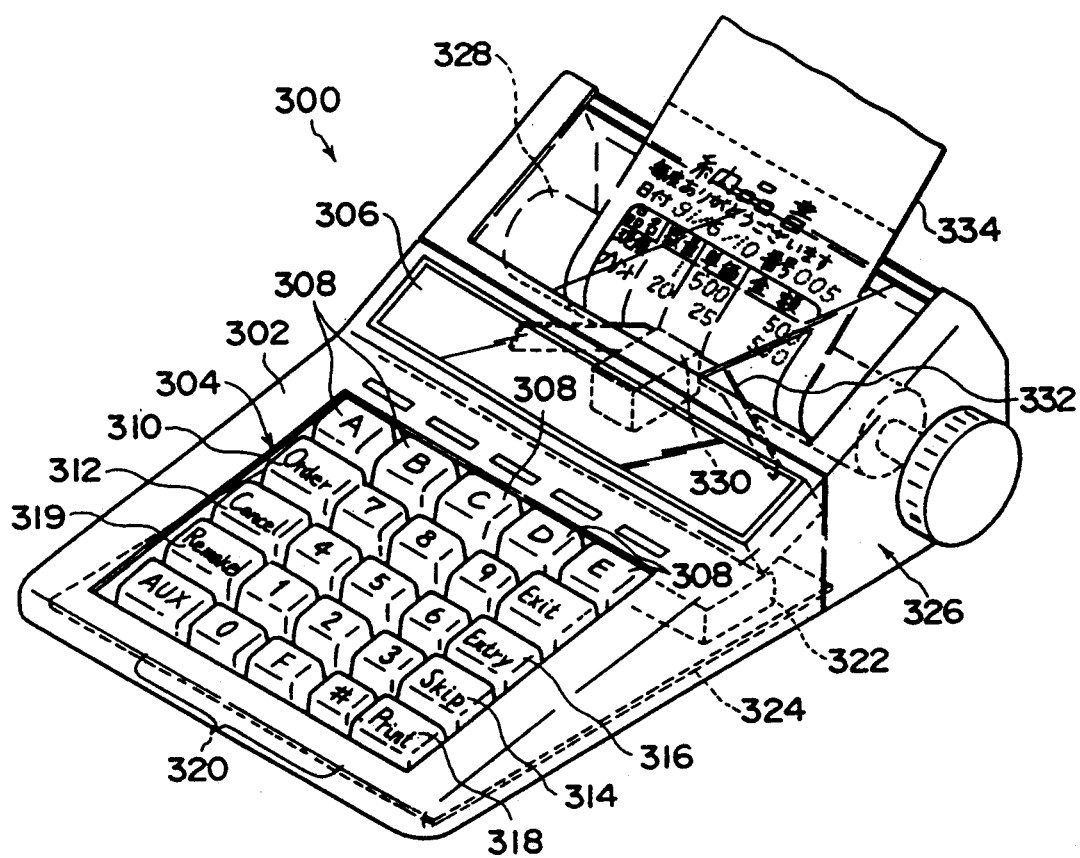
FIG. 5 is a perspective view showing the price printer according to one embodiment of the present invention.

FIG. 5 shows the price printer 300 according to the present embodiment.

Figure 6:
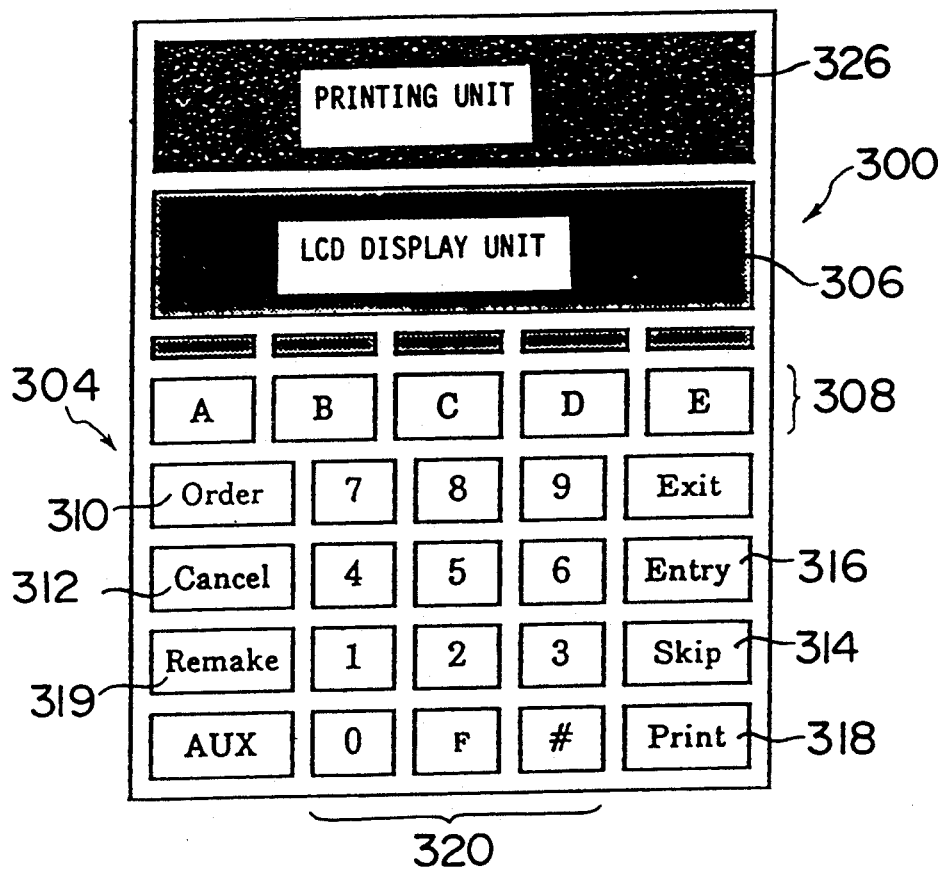
FIG. 6 is a view for describing the arrangement of respective components of the price printer shown in FIG. 5.

The price printer 300 has the sides and the bottom covered by a casing 302. A keyboard 304 serving as an inputting means and an LCD display unit 306 for displaying the contents input via keys of the keyboard 304 are disposed on the top surface of the price printer 300. As shown in FIG. 6, the keyboard 304 is provided with user keys 308 for selecting any one of users A through E, an order key 310 for changing a receiving number, a cancel key 312, a skip key 314, an entry key 316 used to enter input data, a print key 318 for executing a print instruction, a remake key 319 for changing the contents of a print, and ten key 320 for inputting the number of defective prints taken out by the detection. The keyboard 304 is placed on a control substrate 324 including a control unit 322 (see FIG. 5). The LCD display unit 306 is electrically connected to the control substrate 324.

A unit price for each print to be printed, a development price, a print price, etc., which are being set, are displayed on the LCD display unit 306. The set prices can be changed by operating given keys on the keyboard 304.

The price printer 300 has a printing unit 326 which serves as a printing means. The printing unit 326 is connected to the control unit 322 and is provided with a rubber roller 328 rotated by a driving force produced by an unillustrated driving means. A dot impact head 330 is disposed in an opposing relationship to the rubber roller 328.

The dot impact head 330 can be moved toward the axis of the rubber roller 328 by the driving force of the unillustrated driving means.

An ink ribbon 332 is disposed between the rubber roller 328 and the dot impact head 330. Characters or numerals are printed on an original paper 334 by moving (i.e., main-scanning) the dot impact head 330 while the original paper 334 is being fed by rotating (sub-scanning) the rubber roller 328.

Figure 7:
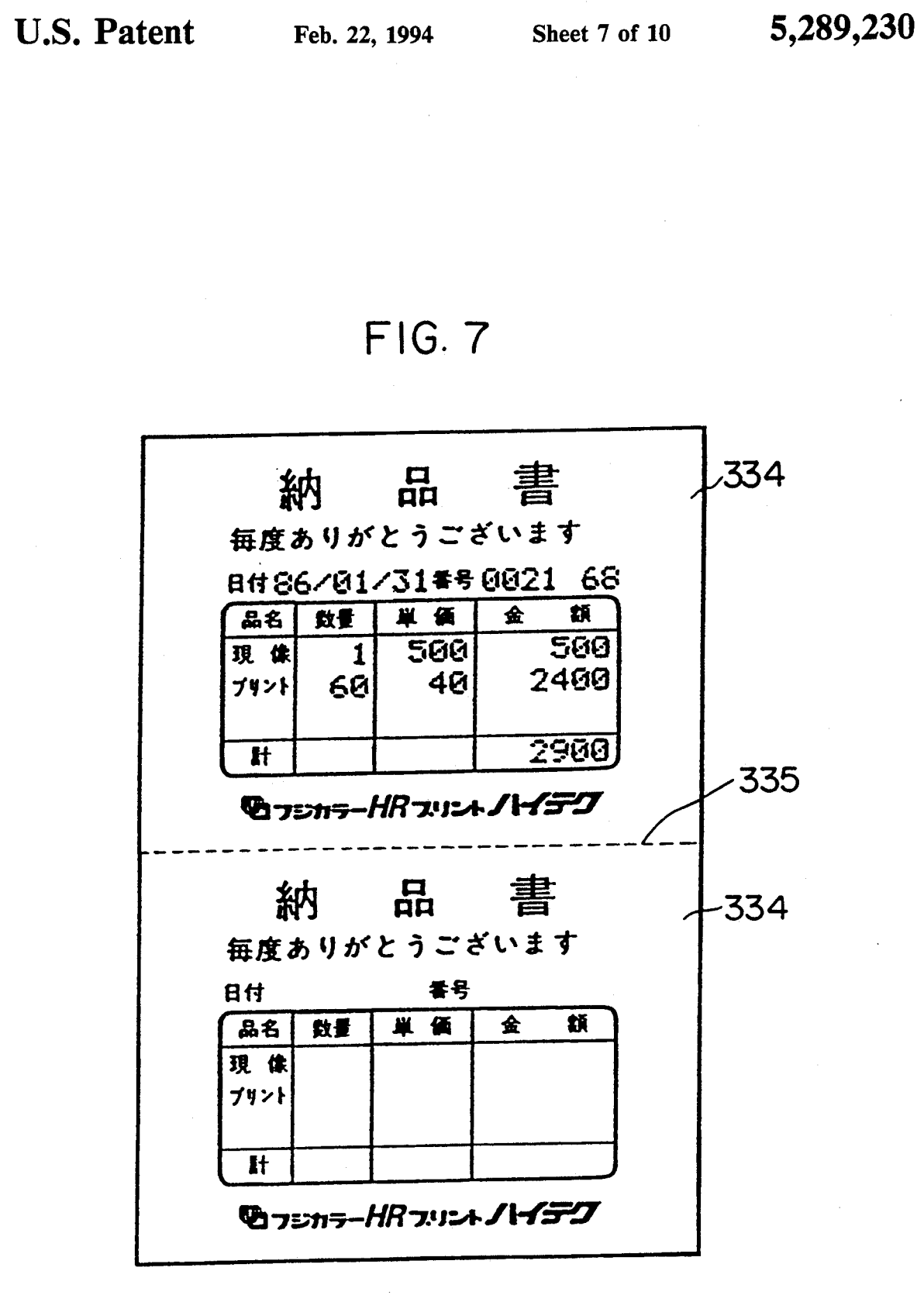

As shown in FIG. 7, given items are continuously printed on the original paper 334 in the form of a statement of delivery. The original papers 334 are sectioned by perforated lines 335.

As illustrated in FIG. 3, the control unit 322 comprises a CPU 336, a RAM 338, a ROM 340, an input/output port 342 and a bus 344. The respective keys of the keyboard 304, the LCD display unit 306, the printing unit 326 are connected to the input/output port 342. In addition, the controller 162 of the printer-processor 10 is connected to the input/output port 342 via an interface 346, and the number of photographic papers which are prints printed by the printer-processor 10 is input to the input/output port 342 via the interface 346.

The printer-processor 10 supplies, to the price printer 300, a signal (e.g., the number of pulses generated by the pulse motor 218 during a period in which the negative film 16 is being detected by the negative-film sensor 276) relative to the length of the negative film 16 and a sort signal (i.e., a signal obtained by detecting the roll splice tape 284 with the tape sensor 274) indicative of completion of a printing process of a single negative film 16.

The control unit 322 determines, based on the input signal relative to the length of the negative film 16 and the input sort signal, how many exposures (e.g., 12 exposures, 24 exposures and 36 exposures) the negative film 16 can make. The result of the determination by the control unit 322 is temporarily stored as data in the RAM 338 together with the number of prints relative to one negative film 16.

The CPU 336 computes a print price corresponding to the number of prints to be actually delivered to a customer from the number of defective prints and a selected unit price of prints both input by the keys on the keyboard 304. The computer print price is output to the printing unit 326 together with a development price corresponding to the size of the negative film 16 and the total of the development price and the print price. Then, these prices can be printed on the original paper 334.

The operation of the present embodiment will now be described below.

A description will first be made of a normal print processing sequence.

In FIG. 1, when a printing process is started, the light source 38 is energized and the negative carrier 18 is driven to position the negative film 16 in place. Thereafter, the density measuring unit 56 measures the LATD (average density or level of transmitted-light) of the negative film 16. An exposure correction value is set based on data about the measured LATD data and data input via keys. Further, the amount of exposure (exposure time) is calculated to determine the most suitable printing condition.

Next, the photographic paper 54 is conveyed to the exposure chamber 52 so as to be positioned in a predetermined place, and the shutter 50 is opened. Thus, the light emitted from the light source 38 passes through the filter unit 40 and the negative film 16 so as to reach the exposure chamber 52. The printing of images on the negative film 16 on the photographic paper 54 positioned in the exposure chamber 52 is started. Then, the respective filters of C, M and Y, which are disposed in the optical axis of the light, are moved in accordance with exposure conditions. After a predetermined exposure time has elapsed, the shutter 50 is closed. Thus, the printing of the images of the negative film 16 on the photographic paper 54 is completed as one frame. By repeating such a printing process, the respective photographic papers 54, which have been subjected to the printing process, are successively conveyed to the second stock unit 73.

A photographic paper 54 conveyed to the second stock unit 73 is fed to the color development unit 74, where the developer is applied so as to be subjected to development. The photographic paper 54, which has been subjected to development, is conveyed to the bleaching fixing unit 76 so as to be subjected to the fixing. The photographic paper 54, which has been subjected to the fixing, is conveyed to the washing unit 78 so as to be subjected to the washing process. Afterwards, the photographic paper 54 is conveyed to the drying unit 80 so as to be subjected to the drying process.

A cut mark applied to the photographic paper 54, which has been dried, is detected by the cutter unit 84. The photographic paper 54 is then cut for each image and the cut photographic papers 54 which are prints are sorted by the sorter 108.

Next, printed defective photographic papers 54 are selected from the sorted photographic papers 54 by performing a detecting process. That is, the photographic papers 54 which are the prints having defects such as a blur, etc. are taken out after the printing process of the printer-processor 10 has been completed. The prints thus taken out are not delivered to the customer.

When the selecting process is completed, a development price, a print price and the total of these prices are printed on the original paper 334 by the price printer 300, thereby drawing up a statement of delivery. The statement of delivery is normally applied to a DPE bag which includes the negative film 16 and the photographic papers (prints) 54 accommodated therein and which is returned to the customer, and delivered to a DPE shop.

When the defective prints are taken out by the detecting process, the difference between the number of the prints printed by the printer-processor 10 and the number of the prints to be actually delivered to the customer is produced. In the present embodiment, the above difference is adjusted and the appropriate price is first printed on the original paper 334.

A processing sequence for printing the prices on the original paper 334 will now be described in accordance with a flowchart shown in each of FIGS. 8, 9A and 9B.

Figure 8:
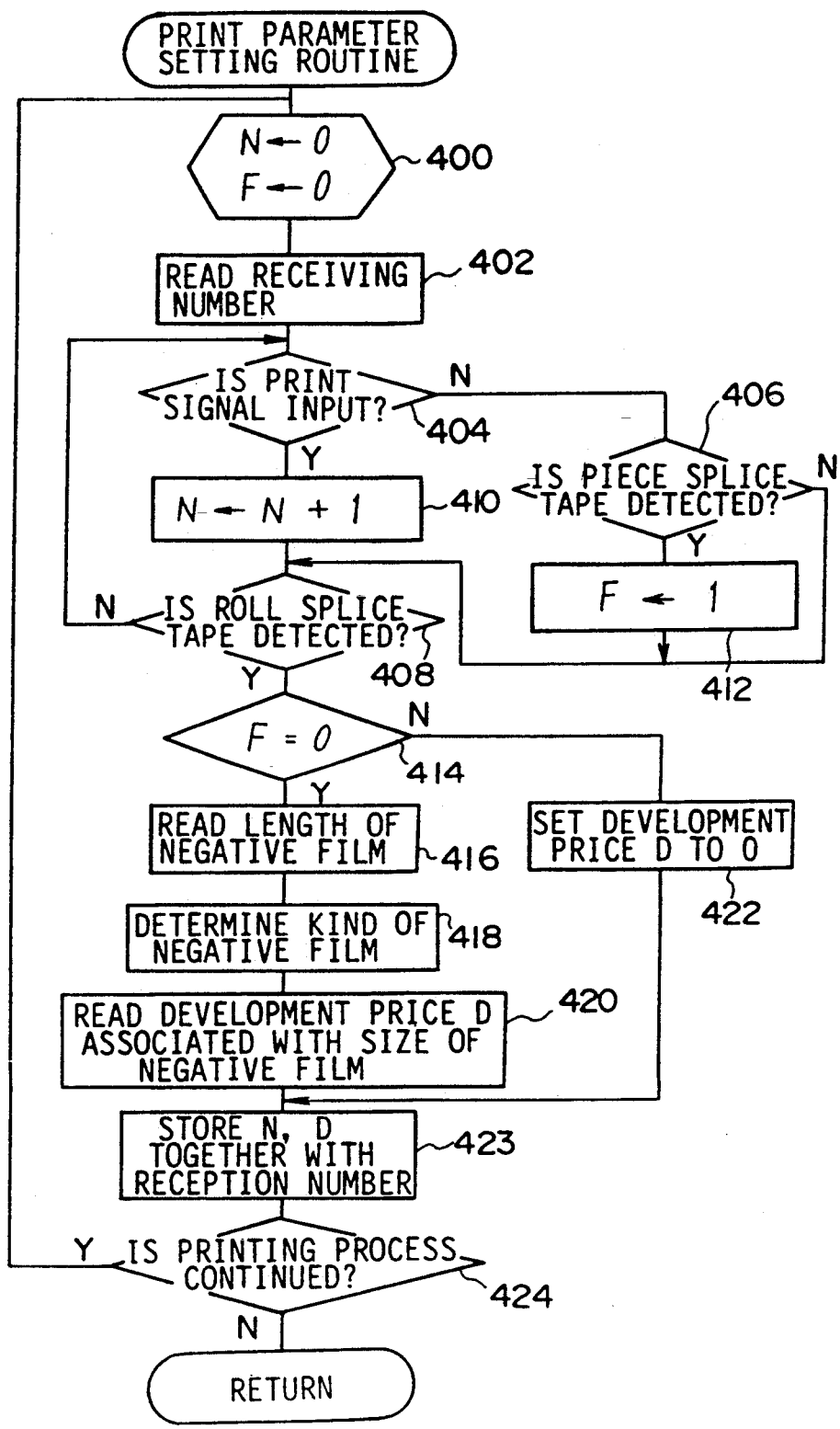
FIG. 8 is a control flowchart for describing a routine for setting print parameters according to the present invention.

FIG. 8 shows a print parameter setting routine.

In Step 400, the number of prints N is cleared and a flag F is reset (i.e., set to 0). The routine procedure then proceeds to Step 402. A receiving number is read in Step 402. The receiving number may be incremented in order from 1. An ID applied to the negative film 16 may be used as an alternative to the receiving number. When the ID is used, it is necessary to read data read by the bar code sensor 282 of the negative carrier 18.

A print signal is output for each print carried out by the printer-processor 10. In the next Step 404, it is determined whether or not the print signal has been input. If the answer is determined to be negative, i.e., No, it is then determined that the negative film 16 is being conveyed. Thus, the routine procedure proceeds to Step 406, where it is determined whether or not the piece splice tape 286 has been detected. If the answer is determined to be No in Step 406, then the routine procedure proceeds to Step 408, where it is determined whether or not the roll splice tape 284 has been detected. That is, the junction point between the negative films 16 is detected during a period in which no print signal is being input.

If the answer is determined to be positive, i.e., Yes in Step 404, then the routine procedure proceeds to Step 410, where the number of the prints N is incremented. Thereafter, the routine procedure proceeds to Step 408.

If the answer is determined to be Yes in Step 406, it is then determined that an extra-printing process be executed. The flag F is set (to 1) in Step 412, and the routine procedure proceeds to Step 408.

If the answer is determined to be Yes in Step 408, it is then determined that the processing of a single negative film 16 has been completed. Thus, the routine procedure proceeds to Step 414, where it is determined whether or not the flag F has been reset. If the answer is determined to be Yes, then the routine procedure proceeds to Step 416.

In Step 416, information about the length of the negative film 16 is read. More specifically, the number of pulses generated by the pulse motor 218 is read during a period from the detection of the leading end of a corresponding negative film 16 by the negative-film sensor 276 of the negative carrier 18 to the detection of the roll splice tape 284. A conveying distance, which is set by one pulse generated by the pulse motor 218, has been determined in advance. Therefore, the length of the single negative film 16 can be obtained by multiplying the above conveying distance by the number of the pulses read.

In the next Step 418, the kind of negative film 16 is determined from the length of the single negative film 16 thus obtained. That is, as the kind of negative film 16, there are 12 exposures, 24 exposures, 36 exposures or the like, and each length has been determined in advance. Therefore, the kind of the corresponding negative film is retrieved and the routine procedure proceeds to Step 420 where a development price D associated with the kind of the negative film is read. Thereafter, the routine procedure proceeds to Step 423.

If the answer is determined to be No in Step 414, that is, if it is determined in Step 414 that the flag F has been set, it is then judged that the extra-printing process has been made. It is therefore unnecessary to charge the development price D. Thus, the development price D is set to 0 in Step 422, and the routine procedure proceeds to Step 423.

In the next Step 423, the number of the prints N and the development price D are temporarily stored as information in the RAM 338.

It is determined in the following Step 424 whether or not the printing process should be continuously executed. If the answer is determined to be Yes, then the routine procedure is returned to Step 400 and the above procedure is repeated.

Figure 9A:
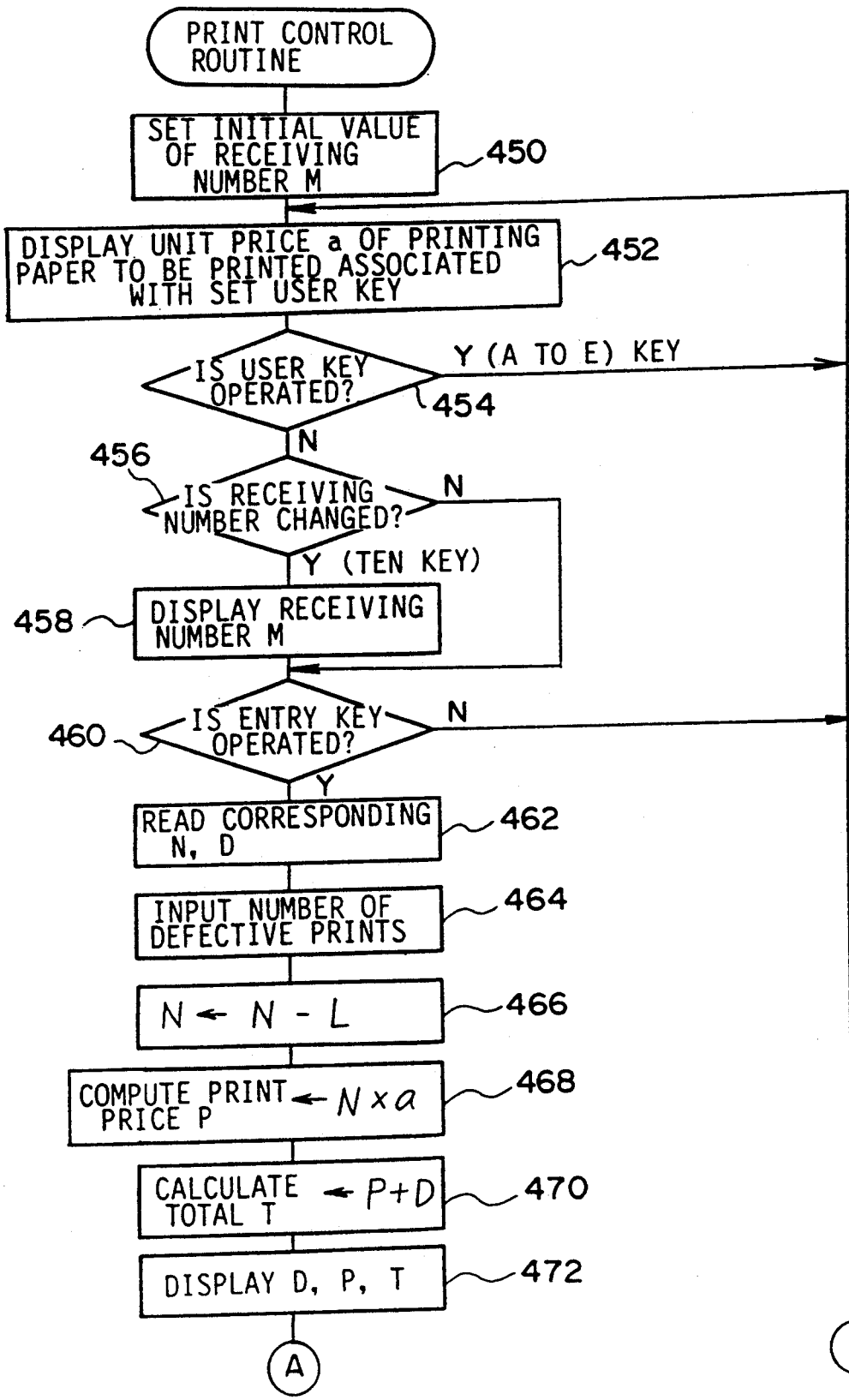

If the answer is determined to be No in Step 424, then the routine procedure is completed and hence a print control routine shown in FIG. 9A is started.

The print control routine will now be described below with reference to FIGS. 9A and 9B.

In Step 450, an initial value of a receiving number M is set and displayed on the LCD display unit 306. The initial value is associated with the receiving number determined in Step 402 of FIG. 8. When the receiving number is incremented in order from 1, for example, the receiving number M is set to 1 in Step 450. When the ID of the negative film 16 is used as the receiving number, the receiving number M may be used as an address in a storage table.

In the next Step 452, a unit price a of a print, which is associated with a user set at present by one of the user keys 308, is displayed on the LCD display unit 306. If it is visually determined by the operator that the unit price a of the print should be changed to another, the operator operates any one of the user keys 308 (i.e., an affirmative decision is made) in Step 454 to change the user to another. Thereafter, the routine procedure is returned to Step 452 where a unit price a of a print, which is associated with the changed user, is displayed on the LCD display unit 306.

If the answer is determined to be negative in Step 454, then the routine procedure proceeds to Step 456. It is determined in Step 456 whether or not it is necessary to change the receiving number to another. That is, when a changing process is stopped in the course of a change in the receiving number, for example, there is often a situation in which the initially-set receiving number is different from a receiving number to be processed. Therefore, the change in the receiving number is to be done in Step 456. When a change in the receiving number is made, a new receiving number M is displayed in Step 458, and the routine procedure proceeds to Step 460. When the receiving number is not changed in Step 458 to proceed to Step 460. It is determined in Step 460 whether or not the entry key 316 has been operated.

The entry key 316 is operated only when it is determined that the unit price a of the print and the receiving number M are appropriate. When the entry key 316 is not operated, the routine procedure is returned to Step 452 from Step 460. When none of keys are operated, Steps 452, 454, 456 and 460 are subsequently repeated.

When the entry key 316 is operated in Step 460, the routine procedure proceeds to Step 462. In Step 462, the number of prints N and a development price D corresponding to a set receiving number are read. Next, the routine procedure advances to Step 464 where the number L of defective prints taken out through detection is input by the ten key 320.

In the next Step 466, the number of the defective prints L is subtracted from the total number of the prints printed N to produce a new N. Next, the routine procedure proceeds to Step 468 to compute a print price (P=N×a). It is therefore possible to compute a print price based on the number of the prints to be actually delivered to a customer.

The routine procedure proceeds to Step 470. In Step 470, the print price P and the development price D are added together to obtain the total cost T (T=P+D). In the following Step 472, the development price D, the print price P and the total cost T are displayed on the LCD display unit 306.

If it is determined that a change in each of the prices is unnecessary after the operator has confirmed the displayed contents, then the print key 318 is operated. If it is determined that the prices should be changed, then the remake key 319 is operated. It is determined in Step 474 whether either the print key 318 or the remake key 319 should be operated. If the print key 318 is operated, then the routine procedure proceeds to Step 476. On the other hand, if the remake key 319 is operated, then the routine procedure proceeds to Step 478.

In Step 478, the contents to be printed are manually corrected or modified by the operator in order to modify it. Thereafter, the routine procedure is returned to Step 474.

In Step 476, a printing process is executed because there is no change in the displayed contents. That is, the rubber roller 328 is driven to position the original paper 334 in a predetermined place. The dot impact head 330 is fed in the main scanning direction and the rubber roller 328 is fed in the sub scanning direction, thereby carrying out a predetermined printing. The original papers 334, which have successively been printed, can easily be separated because perforated lines 335 are formed for each original paper 334. The separated original paper 334 (statement of delivery) is applied to a DPE bag holding a negative film 16 and a photographic paper 54 therein and the so-processed DPE bag is returned to a DPE shop.

It is determined in Step 480 whether or not the routine should be continuously carried out. If the answer is determined to be No, then the routine procedure proceeds to Step 482 where the receiving number M is incremented. Thereafter, the routine procedure is returned to Step 452 where the above procedure is repeated. If the answer is determined to be Yes in Step 480, the routine is completed.

According to the present embodiment, the price printer 300 is placed in a location at which the detection step is carried out. The number of the prints regarded as defective by the detection step is input before printing. The print price is then calculated based on the number of the prints to be actually delivered to the customer from the beginning, and printed on the original paper 334. It is therefore unnecessary to rewrite a statement of delivery and thereby improve the efficiency of work.

The length of the negative film 16, which is related to the development price, can be automatically detected by the negative-film sensor 276 and the pulse motor 218 disposed in the negative carrier 18 of the printer-processor 10, thereby making it possible to reduce the number of operations to be executed by the operator.

Further, the completion of processing of a single negative film 16 is automatically determined by detecting the roll splice tape 284 by the tape sensor 274. It is therefore unnecessary to operate the sort key used to indicate the completion of the processing of the single negative film 16, so that the efficiency of work is improved. At this time, the kinds of splice taps (such as the roll splice tape 284 and the piece splice tape 286) can be determined, thereby making it possible to make a decision as to whether either the simultaneous print or the extra print is required. Thus, the efficiency of the work is further enhanced.

Having now fully described the invention, it will be apparent to those skilled in the art that many changes and modifications can be made without departing from the spirit or scope of the invention as set forth herein.

What is claimed is:

1. A price printer suitable for use with a photographic processing system for printing images which have been recorded on photographic films onto photographic papers, said price printer being used to print prices relative to photographic processing, said price printer comprising:

storing means for storing therein both a unit price of development of the photographic films and the number of developed photographic films and both a unit price of printing of the photographic paper and the number of prints;

inputting means for changing at least one of the unit price of development, the number of developed photographic films, the unit price of printing and the number of the prints;

computing means for computing a development price, a print price and the total of these prices based on the unit price of development, the number of developed photographic films, the unit price of printing and the number of the prints; and printing means for printing said development price, said print price and the total of these prices all of which have been computed by said computing means.

2. A price printer according to claim 1, wherein said inputting means is activated to select a corresponding unit price of development and a corresponding unit price of printing from a plurality of unit prices of development and a plurality of unit prices of printing, respectively, which have previously been determined and input both selected unit prices to said price printer, thereby changing the unit price of development and the unit price of printing.

3. A price printer according to claim 1, further including reading means for reading the number of prints from said photographic processing system.

4. A price printer according to claim 3, wherein said inputting means is activated to input the number of defective prints detected at the time of detection of the images which have been printed on the photographic papers, and said computing means is activated to compute the print price based on the value obtained by subtracting the number of said defective prints input by said inputting means from the number of the prints, which has been read by said reading means, and the unit price of printing, which has been stored in said storing means.

5. A price printer according to claim 1, further including reading means for reading the unit price of development of the photographic film, which has been processed in said photographic processing system, from said photographic processing system.

6. A price printer according to claim 1, further including reading means for reading information about the photographic film, which has been processed in said photographic processing system, from said photographic processing system and setting means for setting the unit price of development based on said information.

7. A price printer according to claim 6, wherein said information read by said reading means represents information about the length of the photographic film which has been processed in said photographic processing system.

8. A price printer system suitable for use with a photographic processing system for printing images which have been recorded on photographic films onto photographic papers, and including a price printer used to print prices relative to photographic processing, said price printer comprising:

reading means for reading information about the photographic film which has been processed in said photographic processing system, and the number of prints;

storing means for storing therein the information about the photographic film, and the number of the prints both of which have been read by said reading means, and a preset unit price of printing;

inputting means for changing the unit price of the printing and for inputting the number of defective prints which have been detected at the time of detection of the images printed on the photographic papers;

setting means for setting a development price based on said information about the photographic film;

computing means for computing a print price based on the value obtained by subtracting the number of said defective prints input by said inputting means from the number of the prints, which has been stored in said storing means, and the unit price of printing and for calculating the total of the print price and the development price; and printing means for printing said development price set by said setting means, said print price computed by said computing means and the total of said development price and said print price.

9. A price printer system according to claim 8, wherein said photographic film information read by said reading means represents a development price.

10. A price printer system according to claim 8, wherein said photographic film information read by said reading means represents information about the length of the photographic film which has been processed in said photographic processing system.

11. A price printer system according to claim 8, wherein when said information represents an extra-printing process of the photographic film, said setting means sets said development price to zero.

12. A price printer system according to claim 8, further including a photographic-film carrier, said photographic-film carrier being used to convey the photographic film in a desired direction so as to position each image frame of the photographic film in a printing position, said photographic-film carrier comprising:

driving means for conveying a lengthy film comprising a plurality of photographic films connected to one another;

detecting means for detecting whether or not the photographic film resides in said photographic-film carrier;

specifying means for detecting and specifying the rear end of a single photographic film;

information determining means for obtaining information about the length of the photographic film during a period from the detection of residence of the photographic film by said detecting means to the specification of the rear end of the single photographic film by said specifying means; and information supplying means for supplying the information about the length of the photographic film determined by said information determining means to said reading means as said photographic film information.

13. A price printer system according to claim 12, wherein said driving means comprises a pulse motor and said length information represents the number of pulses generated by said pulse motor driven during said period.

14. A price printer system according to claim 12, wherein said driving means comprises a pulse motor and said information determining means determines the length of the photographic film based on the number of the pulses generated by said pulse motor driven during said period.

15. A price printer system according to claim 14, wherein said information supplying means determines the kind of photographic film based on the length of the photographic film determined by said information determining means and supplies said determined kind of the photographic film to said reading means of said price printer as photographic film information.

16. A price printer system according to claim 12, further including determining means for determining whether or not the photographic film placed in the printing position is to be subjected to the extra-printing process, and wherein if the answer is determined to be positive, then said information supplying means supplies photographic film information indicative of the fact that the development price is zero to said reading means of said price printer.

* * * * *